Aug. 29, 1944.  W. C. BARNES ET AL  2,356,967
FLAW DETECTING APPARATUS
Filed Feb. 24, 1940  2 Sheets-Sheet 1
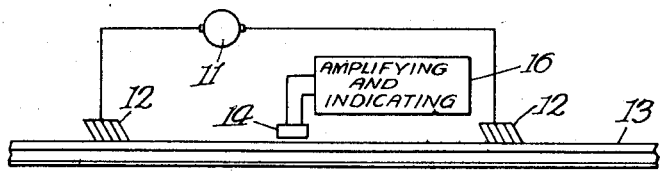
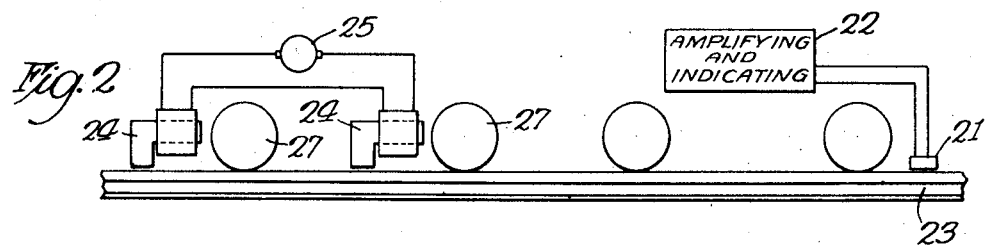
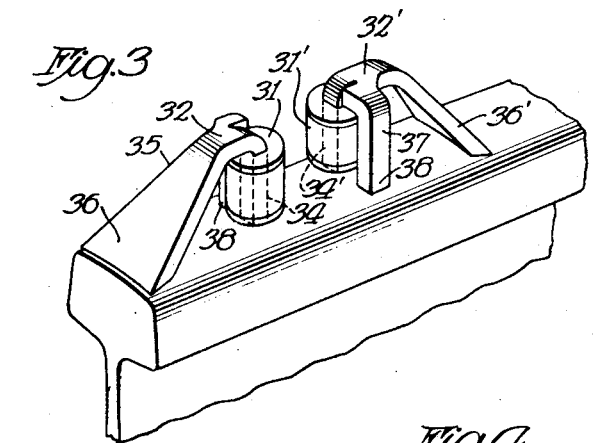
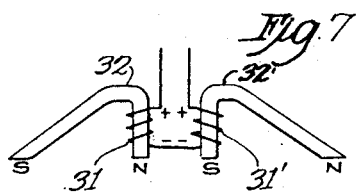
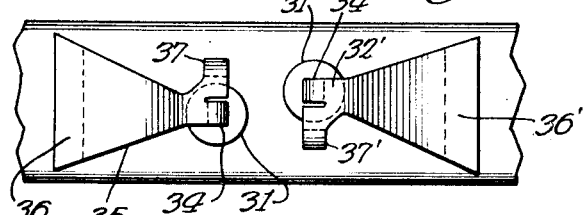
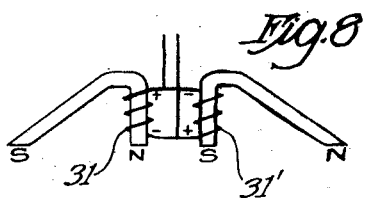
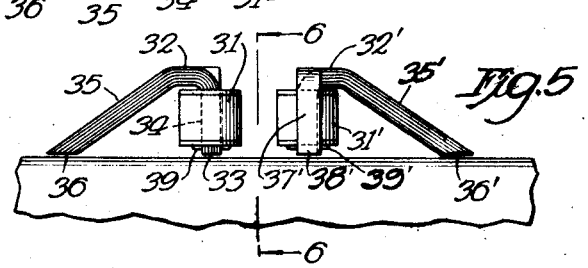
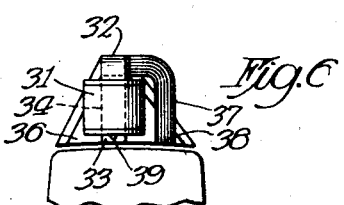
INVENTORS.
Walter C. Barnes
BY Henry W. Keevil
ATTORNEYS

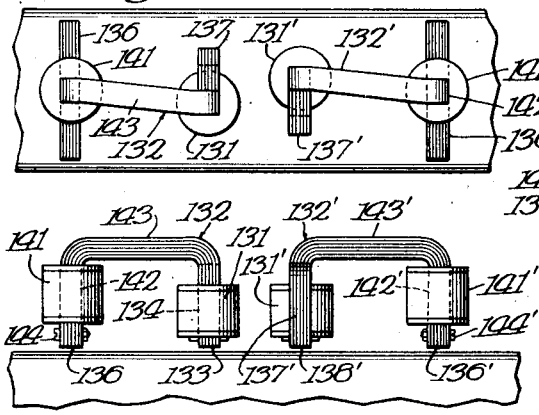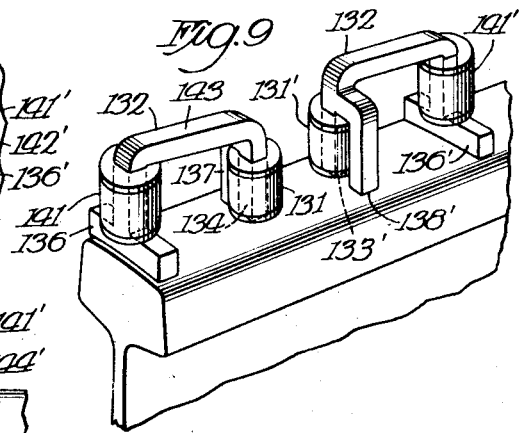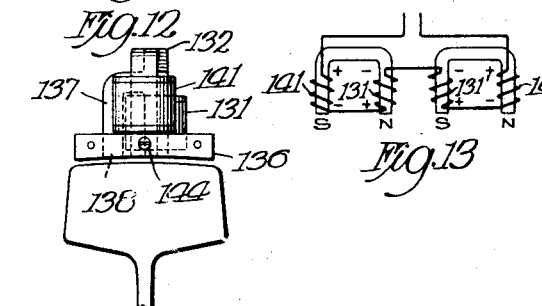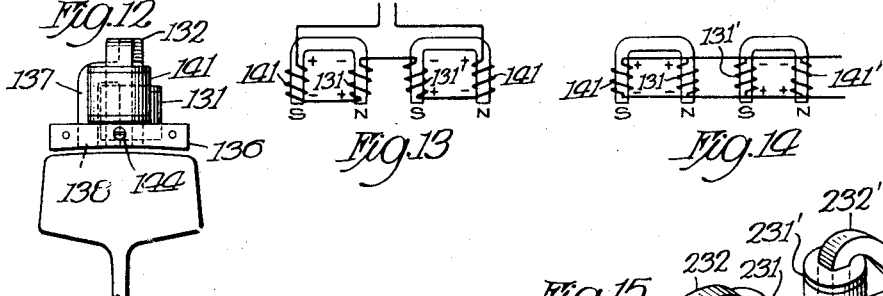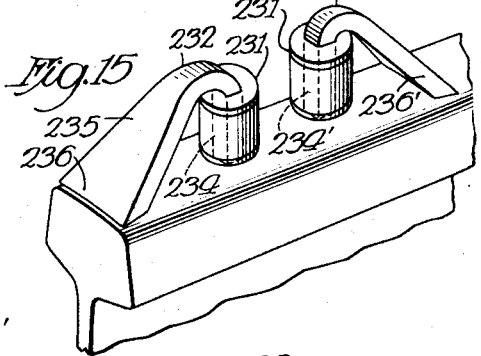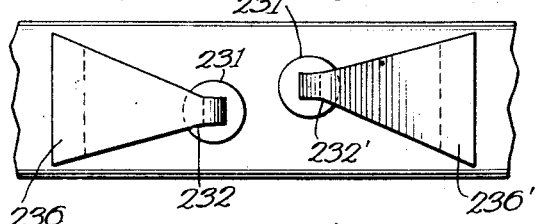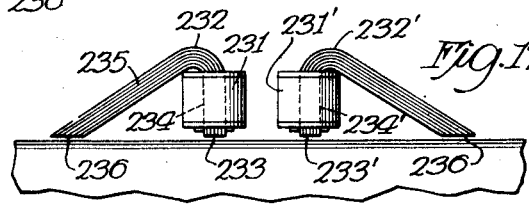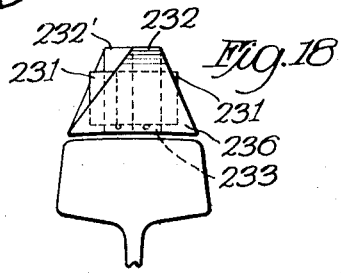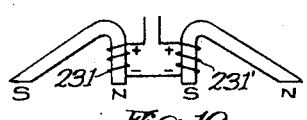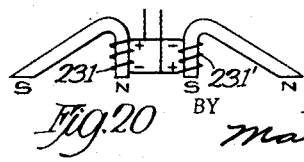

Patented Aug. 29, 1944

2,356,967

UNITED STATES PATENT OFFICE 2,356,967

FLAW DETECTING APPARATUS

Walter C. Barnes, Lake Bluff, and Henry W. Keevil, Highland Park, Ill.

Application February 24, 1940, Serial No. 320,704

13 Claims. (Cl. 175—183)

There are two radically different methods of flaw detection used at the present time for testing rails in track for internal flaws. One is the electroinductive method, in which a heavy current is passed longitudinally through a length of the rail, setting up an electromagnetic field which is non-uniform in the vicinity of flaws and can be detected by a detecting unit passing along the rail. The other method is the residual magnetic method, in which a magnet or preferably a plurality of magnets are passed along a rail to magnetize it, followed by a detector unit positioned far enough behind the magnets to be out of their fields and to respond only to the residual magnetism in the vicinity of flaws.

According to both of these methods of testing, a pick-up unit including at least one coil is moved along close to the rail, the coil being connected to an amplifying and indicating unit. The indicating unit commonly operates a recording graph and also a paint gun to shoot a spot of paint on the rail at the point where a flaw is detected. It is common practice to provide more than one pick-up coil, and in fact with the electroinductive system it has been considered necessary to have a plurality of coils and connect them in series opposition so as to balance out the effects of fluctuations in the current passing through the rail since these fluctuations tend to give false indications of flaws. It is evident that with both systems the reliability of the results depends to a large extent on the pick-up unit.

Among the objects of the present invention are to make various improvements in the pick-up units, particularly in making them more sensitive to types of flaw-produced magnetic conditions which have heretofore been difficult to detect; to make detector units which are simpler and more easily assembled; to provide detector units which are highly sensitive to a wider variety of flaw-produced magnetic conditions than detector units known heretofore, particularly more so than detector units of comparable simplicity; and to provide a variety of pick-up units for meeting a variety of requirements but in each of which vertical coils are used, the vertical coils having an advantage in being relatively immune from magnetic fields which are not within the core and in some embodiments having an advantage of being more easily applied to the cores.

Another object of the invention is to provide a detector unit for electroinductive systems in which a plurality of coils are connected to balance one another and avoid false indications with impulses caused by current fluctuations in the rail, without connecting the coils in series, the series connection being objectionable because each coil acts as a choke coil, tending to choke out the impulses produced by the other in passing over a flaw.

Additional objects and advantages of the invention will be apparent from the following description and from the drawings, in which:

Fig. 1 is a diagrammatic representation of the electroinductive system of flaw detection.

Fig. 2 is a diagrammatic representation of the residual magnetic system of flaw detection.

Figs. 3 to 8 are more or less diagrammatic views illustrating one form of pick-up unit used with either of the systems of Figs. 1 and 2, Fig. 3 being a perspective view, Fig. 4 being a plan view, Fig. 5 being a side elevation, Fig. 6 being an end elevation taken on the line 6—6 of Fig. 5, Fig. 7 being a circuit diagram for series opposition connection of the coils, and Fig. 8 being a circuit diagram for the preferred parallel connection of the coils in which they are in boosting relationship in their own series circuit.

Figs. 9 to 14 are corresponding views for a modified form of the invention.

Figs. 15 to 20 are corresponding views for a third form of the invention.

Three forms of the invention have been chosen for illustration and description, in compliance with section 4888 of the Revised Statutes, but persons skilled in the art will readily perceive other means for accomplishing the same results, and the claims are therefore to be construed as broadly as possible, consistent with the prior art.

In the electroinductive system illustrated in Fig. 1, a generator 11 is connected to brushes 12 which slide in spaced relationship along the rail 13 to be tested. Between them a pick-up unit 14 is moved along the rail with the brushes 12, and in response to non-uniform magnetic conditions in the vicinity of flaws transmits an electrical impulse to the amplifying and indicating apparatus, indicated diagrammatically at 16. According to common practice this apparatus amplifies the electrical impulse and operates relays causing lateral movement of a pen on a uniformly moving graph and also causing operation of a paint gun to shoot a spot of paint on the rail 13.

In the residual magnetic system of Fig. 2, no brushes are used for passing current to the rail, and the pick-up unit 21 sends impulses to the amplifying and indicating unit 22 in response to residual magnetic conditions in the vicinity of flaws in the rail 23 being tested. It is of course necessary that the rail first be magnetized and this is accomplished by an electromagnet 24, or preferably by a plurality of such electromagnets, carried adjacent the rail and energized with direct current in suitable manner as by a generator 25. It may be noted that the cores of the electromagnets 24 are preferably L-shaped and each positioned in front of a wheel 27 of the car carrying it, the purpose of this shape and arrangement being to avoid so far as possible sending a reverse flux through the rail, especially after the final magnetization. Such reverse flux would of course partially de-magnetize the rail. Since the pick-up unit 21 operates in response to residual magnetism, it is desirable to have the magnetism as strong as possible. The electromagnets 24 may be carried by the same car as the pick-up unit 21 or they may be carried by a car in advance of the car carrying the detector unit including the pick-up unit 21 and the amplifying and indicating unit 22.

It will be apparent from the foregoing that the pick-up units comprise a very important part of the flaw detecting system, since the flaw indicating impulses must be initiated in them. Their work is made more difficult by the fact that the flaws may lie at any angle and hence the field about the flaws may have any angular disposition with respect to the rail. Longitudinal flaws may be detected best, particularly in the residual magnetism system and to a lesser extent in the electroinductive system, by a coil which is most sensitive to a field or variations in field extending transversely of the rail, while a transverse flaw may be detected best under like circumstances by a coil which is most sensitive to a field or variations in field extending longitudinally of the rail. In many instances the nature of the flaw is such that the pick-up unit must be extremely sensitive in order to send an adequate impulse to the amplifying and indicating unit.

In Figs. 3 to 8 a pick-up unit has been shown which includes a pair of pick-up devices, each of which is highly sensitive both to longitudinal flux and to transverse flux. Each pick-up device includes a coil 31 mounted on a core 32. In this form of the invention the core preferably includes a pole 33 forming the end of a core portion 34 on which the coil 31 is positioned, a core portion or extension 35 having a large pole 36 spaced longitudinally along the rail from the pole 33, and a core portion 37 terminating in a pole 38 spaced laterally from the pole 33, as seen best in Fig. 6. The poles 33 and 38 are preferably disposed at right angles to the length of the rail so that the coil 31 will have maximum sensitivity for magnetic fields which are at right angles to the length of the rail. The pole 36 has a portion which is directly in alignment longitudinally of the rail with the pole 33 so that the coil 31 is also highly sensitive to longitudinal flux. Although part of the longitudinal flux entering the pole 36 passes through the core portion 37 instead of through the core portion 34 which is within the coil 31, it will be observed that the face of pole 36 is larger than the combined cross section of core portion 34 and core portion 37. Accordingly, in spite of the division of the flux there is a concentration of the flux in the core portion 34 which renders the coil 31 highly sensitive to longitudinal flux.

The pole 33 and the core portion 34 are of uniform cross section so that the coil 31 may be prewound and slipped thereon, being held in position by any suitable means such as a cotter pin 39. In order for the pole 33 to be adjacent the rail, and the core portion 34 together with pole 33 still to be positioned in a straight line, it is necessary for this core portion to be generally vertical and hence the coil 31 is also a vertical coil. Aside from ease of assembly, this has an additional advantage in that the coil 31 is relatively insensitive to stray fields, by which is meant fields not gathered in by the core structure. Neither longitudinal nor transverse stray fields have any appreciable effect on the coil 31 so long as these fields are horizontal and hence cut the coil in a plane perpendicular to its axis.

In the electroinductive system it is impossible to maintain a uniform current through the rail 13 as the car moves along and hence it is necessary to cause balancing out of the impulses due to the current fluctuation. To this end it has been common practice to connect two coils in series opposition. To distinguish between the two coils one of them has been marked with a prime in all figures. As seen in Fig. 7, the coils 31 and 31' are connected so that if a flux is traveling in any single direction with respect to the rail, a fluctuation in this flux will cause opposite effects in the two coils 31 and 31' which are connected in series. This is best indicated diagrammatically by the inclusion of symbols for the positive and negative ends of the coils. From the figure it is seen that for a given fluctuation the two adjacent ends of the coil are both negative while the opposite ends are both positive. Thus, the two coils are in bucking or opposition relationship, and to the extent that they are equally affected by a given fluctuation no current will flow through coils and no impulse will be transmitted to the amplifying and indicating unit 16.

In order for the coils 31 and 31' to balance out as to fluctuations they should be approximately balanced for both longitudinal and transverse flux. This is accomplished by providing them with identical cores, having angular dispositions 180° apart. Thus, in one pick-up device the pole 36 is positioned forwardly with respect to the pole 33, while in the other pick-up device it is positioned rearwardly. Looking at Fig. 5, it will be observed that if there is a component of flux adjacent to the rail from left to right, any flux passing through the core portions 34 and 35 will pass downwardly through the left-hand coil 31 and upwardly through the right-hand coil 31'. Likewise, in Fig. 4 if the flux is passing from the far side of the rail to the near side of the rail, it will pass downwardly through coil 31 and upwardly through coil 31'. Therefore, it is seen that both as to longitudinal and transverse flux, flux in a given direction will pass in opposite directions through the two coils, upwardly in one and downwardly in the other. Accordingly, a pick-up unit comprising two coils thus oppositely disposed will be automatically balanced as to fluctuations in rail current provided that the coils are connected in series opposition.

The term "series opposition" applies only to the electroinductive system and in that system means that the coils through which the current induced in the coils flows in series to the amplifier are so connected (considering the direction of flux resulting from the rail current) that the impulses caused by a fluctuation of the current in the rail buck one another so that no current flows through the coils or to the amplifier.

It has been assumed heretofore that for the electroinductive system the coils must be connected in series opposition. As indicated in Fig. 8, however, they may be connected in parallel provided that they are properly connected in parallel. Whenever coils are connected in parallel, they form a closed series circuit of their own. Thus, in Fig. 8 it is seen that the coils 31 and 31' form a closed circuit. For coils thus to be connected in parallel in the electroinductive system they must be connected in their own series circuit in boosting or mutually short-circuiting relationship instead of in series opposition. This is indicated in Fig. 8 by a negative sign at the bottom end of coil 31 and a positive sign at the bottom end of coil 31', these ends being connected together and, correspondingly, positive and negative ends of coils 31 and 31' being connected together at the top ends of the coils. Again it is to be understood that these signs refer to fluctuation of a flux passing in one direction with respect to the rail and hence in opposite directions through the coils, upwardly in one and downwardly in the other. It follows that a fluctuation in such flux will generate an impulse in both of the coils 31 and 31' but these impulses will be equal and in boosting relationship within the series circuit, so that each will in effect short-circuit the other and no impulse will be transmitted to the amplifying and indicating unit. The energy of the impulse will of course be dissipated by the resistance of the coils, but since the current values are extremely small there will be no objectionable heating of the coils.

Although the connections of Fig. 7 can be used in the residual magnetic system of Fig. 2, this type of connection is not desirable and in fact even in the electroinductive system comprises merely a necessary evil. The connections of Fig. 8 are preferred in both instances. In Fig. 7 when an impulse is produced in the coil 31, for example, by a flaw in the rail, the coil 31' acts as a choke coil tending to prevent this impulse from reaching the amplifying and indicating unit. When the coils are in parallel as in Fig. 8, there is no choke effect and because of the high impedance of the coils there is no objectionable shunting effect. As a matter of fact, it has been customary to use a higher impedance with residual magnetic systems than with electroinductive systems, and in this respect this is desirable in making the detection of flaws more certain. With the connections shown in Fig. 8 it is possible to use the high impedance coils heretofore used advantageously in the residual magnetism system. It is desirable to use a higher impedance than heretofore common with the electroinductive system, so as to prevent one from shunting out the other.

One advantage of the particular parallel connections shown in Fig. 8 is that the two coils sometimes tend to cooperate with one another, and never materially nullify one another except in the case of current fluctuation or the like, in which case balancing out is desired. When there is a flow in a rail, there is no detectable magnetic field or field irregularity except quite close to the flaw. Accordingly, when the first of two tandem pick-up devices is over the flaw or approaching the flaw, the second pick-up device is not close enough to the flaw to be affected by it. The one time when the two devices are both close enough to the flaw to be affected by it is when the flaw is between them. In this situation the flaw has an opposite effect on the two coils 31 and 31'. If we assume, as is believed to be the case, that the coil which has already passed over the flaw is in a receding or decreasing field, the coil 31' which is approaching the flaw will be in an increasing field. Since the flux is nevertheless generally in one direction (though passing downwardly through one coil and upwardly through the other) the increase of flux in one coil simultaneously with the decrease of flux in the other coil will have exactly the opposite effect of that produced by a common decrease of flux due to a fluctuation of current or the like. In this instance if the coil 31 became positive at its upper end as indicated at Fig. 8, the coil 31' would also be positive at its upper end, and hence these coils would no longer be in boosting or short-circuiting relation within their own closed circuit but would be in cooperative relationship in sending an impulse to the amplifying and indicating unit. Although the voltage available might not be any greater than that theoretically available from one coil alone, twice as much current would be available and hence the two coils connected in parallel as in Fig. 8 would be more sure to indicate a flaw than would both coils acting separately, each connected to its own amplifying and indicating unit.

The pick-up unit shown in Figs. 10 to 14 is similar in many respects to that shown in Figs. 3 to 8. Therefore, to the extent that they are the same, the same reference numerals will be used except for being preceded by the number "1" so that, for example, the pole 33 of Fig. 5 corresponds to the pole 133 of Fig. 11. Thus, a coil 131 is positioned on a core 132. The core 132 has a pole 133 at the end of a core portion 134 extending through coil 131. Longitudinally disposed with respect to the pole 133 is a pole 136 which extends substantially across the rail head. Transversely separated from the pole 133 and preferably at right angles therefrom with respect to the rail is a pole 138 at the end of a core portion 137. In this instance, however, an additional coil 141 is provided, being mounted on a core portion 142 which is connected to the core portions 134 and 137 through a core portion 143.

The discussion of Figs. 3 to 8 applies to the structure of Figs. 9 to 14 with a few additions and amplifications. While the coil 131 may be pre-wound and slipped over the core portion 134, this simplification cannot be obtained quite so easily with respect to the coil 141. This coil may be wound on the core or it may be pre-wound and slipped on the core by making the core divisible. Thus, as is well known, the core portion 142 and pole piece 136 may be interleaved at their junction, the two parts and loose laminations of the pole piece being secured firmly in any suitable manner, indicated diagrammatically by bolts 144.

In Fig. 13 the four coils 131, 131', 141 and 141' have been indicated as being all connected in series with like coils in opposition to one another. It has been proposed to use four coils (on separate cores) with one amplifier in the electroinductive system by connecting all four in series, two coils in opposition to the other two. In Fig. 13 the positive and negative signs indicate that coils 141 and 141' are in series opposition, and that coils 131 and 131' are likewise in series opposition. Coils 141 and 131 on a single core should not be in series opposition since they would then tend to balance out each other's impulse produced by longitudinal flux in the vicinity of a flaw between them. In other words, the connections are such as to produce the series opposition between like coils on different cores. If the coils on one core are connected as shown, they might be in series opposition as to some transverse flux, but this is believed to be of no significance since comparatively little transverse flux flows through coil 141. If tests show poor detection under certain conditions with the electroinductive system, the connections for coils 131 should be reversed.

In Fig. 14 the preferred parallel connections for these coils are shown. In this instance the coils 141 and 141', although connected in parallel, are in their own series circuit in boosting relationship with respect to a common flux or a fluctuation in the rail current, and the same is true of coils 131 and 131'. Nevertheless, when a flaw is between the two pick-up devices, specifically between coils 131 and 131', the various coils will cooperate to transmit an impulse to the amplifying and indicating unit. Likewise, when a flaw is between coils 141 and 131, these two coils will cooperate to transmit an impulse to the amplifying and indicating unit. At this time the coils 131' and 141' will be too remote from the flaw to be materially affected by it.

In Figs. 15 to 18 reference numerals in the two hundred series have been used for parts corresponding to parts already described. Thus, a coil 231 is mounted on a core 232. The core 232 has a pole 233 and a core portion 234, both of which are vertically disposed so that the coil 231 may be pre-wound and slipped thereon. A core portion 235 terminates in a pole 236 which extends substantially the width of the rail head, as seen in Fig. 16. As in Figs. 7 and 8, the coils are connected in Figs. 19 and 20 in series opposition and with the preferred parallel connections respectively. This pick-up unit takes advantage of the vertical coil arrangement with its resulting simplification and of the concentration of longitudinal flux from a large pole face 236 through the coil 231. Although in these figures there is no transversely disposed pole such as the poles 38 and 138, there is a fair sensitivity to transverse flux because of the width of the wide pole faces 236, some of the transverse flux entering this pole face 236 at one side of the rail passing through the coil 231. At the same time the maximum possible concentration of flux from the pole face 236 is obtained since substantially all of this flux must pass through the coil 231.

Since the body of pole portion 236 is inclined and its face is horizontal, the area of its pole face is greater than if the face were cut in a plane perpendicular to the inclination of the pole portion.

It may be noted that the pole face of any transversely extending pole may be slightly concave transversely to correspond with the average shape of the rail head. Also, slightly better results can be obtained with laminated cores, and all of the cores shown are designed to make their construction of laminations practical.

It will be observed that for better response to the transverse flux, all of the figures show the coils 31, etc., slightly off-center. It will be obvious, however, that, if preferred, they may all be centered with respect to the pick-up unit. In fact, it may be stated generally that various changes may be made in the positions and shapes of the pole faces. For example, it may be found desirable to make the large pole face still larger, either to concentrate more flux through the coil or to permit this pole face to be spaced farther from the rail and to extend a greater length along the rail so that in a sense the presence of the flaws will be detected primarily by the small pole face or faces adjacent the rail.

From the foregoing it is seen that a plurality of pick-up units have been devised which are exceedingly sensitive to both longitudinal and transverse flux and which, considering the sensitivity provided, are surprisingly simple. Although the form of the invention shown in Figs. 15 to 18 is not as sensitive to transverse flux as the other illustrated forms, it is exceptionally sensitive for longitudinal flux and has the merits of exceptional simplicity.

We claim:

1. A pick-up unit for rail flaw detection by movement along a rail in a given forward direction, including a plurality of coils, and a core for each of the coils, each of the cores including three poles, two of which are disposed at right angles to the length of the pick-up unit so as to be disposed at right angles to the length of the rail, and the other of which is displaced longitudinally of the rail from said two poles, the coil surrounding a portion of the core between one of said two poles and the other two poles, one coil being to the left of its adjacent laterally disposed pole and the other being to the right of its adjacent laterally disposed pole, and one being to the rear of the longitudinally displaced pole and the other being forwardly of the longitudinally displaced pole.

2. A pick-up unit for rail flaw detection by movement along a rail in a given forward direction, including a plurality of coils, and a core for each of the coils, each of the cores including three poles, two of which are disposed at right angles to the length of the pick-up unit so as to be disposed at right angles to the length of the rail, and the other of which is displaced longitudinally of the rail from said two poles, the coil surrounding a portion of the core between one of said two poles and the other two poles, one coil being to the left of its adjacent laterally disposed pole and the other being to the right of its adjacent laterally disposed pole, and one being to the rear of the longitudinally displaced pole and the other being forwardly of the longitudinally displaced pole, and said coils being connected together in a manner to balance out any impulses produced simultaneously therein by a uniform fluctuation in the magnetic field to which they are subjected.

3. A pick-up unit adapted for movement in a longitudinal direction, including a plurality of pick-up devices, each device including a core having a coil mounted thereon, and each core including a first pole, a second pole laterally displaced therefrom, and a third pole longitudinally displaced therefrom, with the coil surrounding a portion of the core between the first pole and the second and third poles, the first and second poles being oppositely disposed in the two devices, and the first and third poles being oppositely disposed in the two devices.

4. A pick-up device for movement along a rail, including a core having a first pole, a second pole spaced at right angles to the length of the rail from the first pole, and a third pole spaced longitudinally of the rail from the first pole, with the coil surrounding a portion of the core between the first pole and the second and third poles.

5. A pick-up device for movement along a rail, including a core having a first pole, a second pole spaced at right angles to the length of the rail from the first pole, and a third pole spaced longitudinally of the rail from the first pole and adapted to extend substantially across the width of the rail head, with the coil surrounding a portion of the core between the first pole and the second and third poles.

6. A pick-up device for movement along a rail, including a core having a first pole, a second pole spaced at right angles to the length of the rail from the first pole, and a third pole spaced longitudinally of the rail from the first pole and adapted to extend substantially across the width of the rail head, with the coil surrounding a portion of the core between the first pole and the second and third poles, the portion of the core surrounded by the coil and the first pole being formed of substantially uniform cross section and being approximately vertically disposed whereby the coil may be pre-wound and slipped onto the core.

7. A pick-up unit includng two like pick-up devices, each having a core with a coil thereon, each core having a pole extending substantially across a rail with its pole face adjacent the rail substantially throughout the extent of the pole, and a pole displaced longitudinally of the pick-up unit therefrom and positioned at one side of the center of the unit, the two like devices being at augular positions displaced at approximately 180° from one another about their vertical axes, and each of said coils being on a portion of the core connecting the two named poles thereof.

8. A pick-up unit including two like pick-up devices, each having a core with a pick-up coil mounted thereon, each core having a pole extending substantially across a rail with its pole face adjacent the rail substantially throughout the extent of the pole, and a pole displaced longitudinally of the pick-up unit therefrom and positioned at one side of the center of the unit, the two like devices being at angular positions displaced at approximately 180° from one another about their vertical axes, the last named poles and the portions of the cores surrounded by the coils being formed by a substantially vertical core portion of substantially uniform cross section whereby the coils may be pre-wound coils slipped in place.

9. A pick-up unit including a core and a pair of coils, the core having a pole piece extending substantially the width of the rail with the core portion extending therefrom through one coil, the other end of the core portion having two poles associated therewith, the other coil being positioned about a part of the core between said two last named poles and between one of said poles and said core portion.

10. A pick-up unit including a pair of pick-up devices each including a core and a pair of coils, the core having a pole piece extending substantially the width of the rail with the core portion extending therefrom through one coil, the other end of the core portion having two poles associated therewith, the other coil being positioned about a part of the core between said two last named poles and between one of said poles and said core portion, with said devices oppositely disposed and with the coils of one device connected in balancing relation to the coils of the other device with respect to a uniform magnetic fluctuation.

11. A pick-up device including a core having at least three poles of which one is a large pole and one is a small pole, and having a coil on the core, the small pole and the core portion extending therefrom through the coil being so shaped as to permit removal of the coil therefrom and hence application of a pre-wound coil thereto, said core portion being continued to form the large pole, and said large pole being much greater in cross section than the cross section of said core portion, the magnetic path including the large pole and the small pole having greater permeance than that including the large pole and all unnamed poles whereby there will be a tendency for the majority of flux to pass through said coil.

12. A pick-up device including a core having at least three poles and at least two pick-up coils mounted on said core, with the arrangement of the poles magnetically at opposite sides of one coil being different from the arrangement of poles magnetically at opposite sides of the other coil whereby flux in a given direction will react differently on the two coils, and flux in another direction will have a different reaction on the two coils.

13. A pick-up unit including a pair of pick-up devices each including a core and a pair of coils, the core having a pole piece extending substantially the width of the rail with the core portion extending therefrom through one coil, the other end of the core portion having two poles associated therewith, the other coil being positioned about a part of the core between said two last named poles and between one of said poles and said core portion, with said devices oppositely disposed and with the coils of one device connected in balancing relation to the coils of the other device with respect to a uniform magnetic fluctuation, the two coils of each device connected to have a cooperative impulse-producing effect in response to a non-uniformity in the flux longitudinal of the rail.

WALTER C. BARNES.
HENRY W. KEEVIL.